(12) United States Patent
Arnaud et al.

(10) Patent No.: US 6,425,429 B1
(45) Date of Patent: Jul. 30, 2002

(54) TIRE HAVING CIRCUMFERENTIAL CABLES FOR ANCHORING THE CARCASS AND PROCESS OF PREPARING SUCH CABLES

(75) Inventors: Jean-Claude Arnaud, Durtol; Pedro Costa Pereira, Clermont-Ferrand, both of (FR)

(73) Assignee: Sedepro (FR)

( * ) Notice: Subject to any disclaimer, the term of this patent is extended or adjusted under 35 U.S.C. 154(b) by 0 days.

(21) Appl. No.: 09/523,911

(22) Filed: Mar. 9, 2000

Related U.S. Application Data (62) Division of application No. 08/857,735, filed on May 16, 1997, now Pat. No. 6,093,267, which is a division of application No. 08/673,052, filed on Jun. 28, 1996, now Pat. No. 5,702,548.

(30) Foreign Application Priority Data

Jun. 29, 1995 (FR) .............................. 95 07977

(51) Int. Cl.⁷ ................................................ B60C 1/00
(52) U.S. Cl. ...................... 152/547; 152/539; 152/550
(58) Field of Search ................... 152/547, 539, 152/549, 550, 548, 555, 560

(56) References Cited

U.S. PATENT DOCUMENTS

| 2,966,933 A | 1/1961 | Boussu et al. ............ 152/540 |
| 3,072,171 A | 1/1963 | Drakeford et al. ......... 152/541 |
| 3,749,558 A | 7/1973 | Dillenschneider ......... 428/675 |
| 3,815,652 A | 6/1974 | Pouilloux ................. 152/542 |
| 4,106,957 A | 8/1978 | Tournoy .................. 148/529 |
| 4,407,683 A | 10/1983 | Hijikata et al. ........... 140/568 |
| 4,683,175 A | 7/1987 | Bakewell et al. .......... 148/532 |
| 4,788,394 A | 11/1988 | Vanneste et al. .......... 148/595 |
| 4,830,684 A | 5/1989 | Reiniche ................. 148/576 |
| 5,435,370 A * | 7/1995 | Ahmad et al. ............ 152/550 |
| 5,660,656 A | 8/1997 | Herbelleau et al. |
| 6,109,321 A * | 8/2000 | Costa Pereira et al. ..... 152/547 |
| 6,179,029 B1 * | 1/2001 | Costa Pereira et al. ..... 152/525 |

FOREIGN PATENT DOCUMENTS

| EP | 5821961 | 2/1994 |
| EP | 6116691 | 8/1994 |
| FR | 1234995 | 11/1960 |
| FR | 2055988 | 5/1971 |
| FR | 2615453 | 11/1988 |
| JP | 2175984 | 7/1990 |

* cited by examiner

*Primary Examiner*—Edward J. Cain
*Assistant Examiner*—Kataryna W. Lee
(74) *Attorney, Agent, or Firm*—Baker Botts LLP (57) ABSTRACT

The anchoring of the carcass reinforcing elements 1 is assured by circumferential cables 2, with the interposition of a connecting rubber composition 3. The circumferential cable 2 is arranged in several turns forming one or more helices. These circumferential cables have an operational elongation rate $A_f = A_e + A_p$ of more than 4%. This operational elongation rate does not include the specific elongation $A_s$ of the "cable" effect. The maximum stress $R_m$ of the cable 2 is preferably more than 2000 MPa. The cables have undergone a heat treatment which has, in combination, the features of being a recovery annealing treatment and which is carried out directly on cable comprising wires previously separately covered by an adherent coating.

4 Claims, 8 Drawing Sheets

TIRE HAVING CIRCUMFERENTIAL CABLES FOR ANCHORING THE CARCASS AND PROCESS OF PREPARING SUCH CABLES

This is a division of application Ser. No. 08/857,735 filed May 16, 1997, now U.S. Pat. No. 6,093,267, which, in turn, is a division of application Ser. No. 08/673,052 filed Jun. 28, 1996, now U.S. Pat. No. 5,702,548.

BACKGROUND OF THE INVENTION

The present invention relates to tires. More particularly, it concerns the design of the beads of tires.

The purpose of the beads of tires is known; it is to assure proper mounting of the tire on the rim. For this purpose, the carcass cables all reach the lower part of the bead where they are firmly anchored in order that the carcass can withstand the stresses in operation.

Very recently, a new type of bead has been proposed in EP patent application 0582196 (corresponding U.S. application Ser. No. 08/331,373. This bead does not have the customary turn-up of the carcass around a bead wire. Instead, at the place of the anchoring, the carcass reinforcing elements are arranged in one or more alignments. Considering the arrangement of the assembly of these elements in space, they approximate the shape, within each alignment, of a partial conical frustrum the axis of which coincides with the axis of rotation of the tire. The carcass reinforcing elements are bordered laterally by at least one pile of circumferential reinforcing elements produced for instance by helical winding. Furthermore, a suitable connecting rubber mix assures the transmission of forces between these reinforcing elements which are directed perpendicular to each other.

The tests carried out by the applicant have shown that such a bead structure excellently withstands the stresses encountered in use, even severe use, in both passenger car tires and tires for other applications. In addition to the stresses to which the tire is subjected during operation, the tire must furthermore be capable of experiencing an indeterminate number of removals followed by remounting in order to continue the use thereof.

It is known that when the tire is mounted on a wheel, the greater the clamping of the bead the less the tendency of the tire to leave the rim. It may be recalled that the clamping is the force of compression of the rubber located in the radially lowermost part of the bead, developing a pressure on the radially outer surface of the seat of the corresponding rim. A certain level of clamping is necessary in order to be able to transmit a braking or driving torque between the rim and the tire. The clamping depends not only on the properties of the tire itself (geometry of the bead, rigidity of the materials used in it) but also the geometry of the rim itself.

It is also known that the greater the clamping the greater will be the difficulties in mounting and/or dismounting the tire. The dismounting, in particular, involves applying a rather large force (a function of the clamping on the rim) on the bead at the level of the flange of the rim or just above it. This force is directed parallel to the axis of rotation and is always applied locally by a push bar or a lever. These tools apply a deformation on the bead of the tire. This deformation may be very substantial. This is the first phase of the dismounting, the purpose of which is to unseat the bead, that is to say cause it to leave its seat, by removing it from the rim flange. During this first phase, the bead of the tire is subjected to local but very substantial stretching forces.

Thereupon, levers are generally used in order to force the bead over the rim flange. In fact, in the case of tires formed in a single piece (which is the general case for tires for passenger cars and vans), the shape of the rim is designed to permit mounting and dismounting due to an ovalizing of the bead without increasing its perimeter. This substantially determines the design of the central mounting well and of the flanges laterally bordering the rim and defining the mounting position of the bead. During this second phase, the bead undergoes an overall deformation which is far less penalizing than the stresses occurring during the first phase.

The designer of the tire seeks to achieve a good compromise between safety (low sensitivity to unseating), in particular, by controlling the clamping, and ease of mounting/dismounting. Satisfaction of these requirements (operating stresses and stresses upon mounting and dismounting) which are somewhat contradictory and the desire to simplify the manufacture and limit the weight of material are objects of the present invention.

SUMMARY OF THE INVENTION

Figure 3:
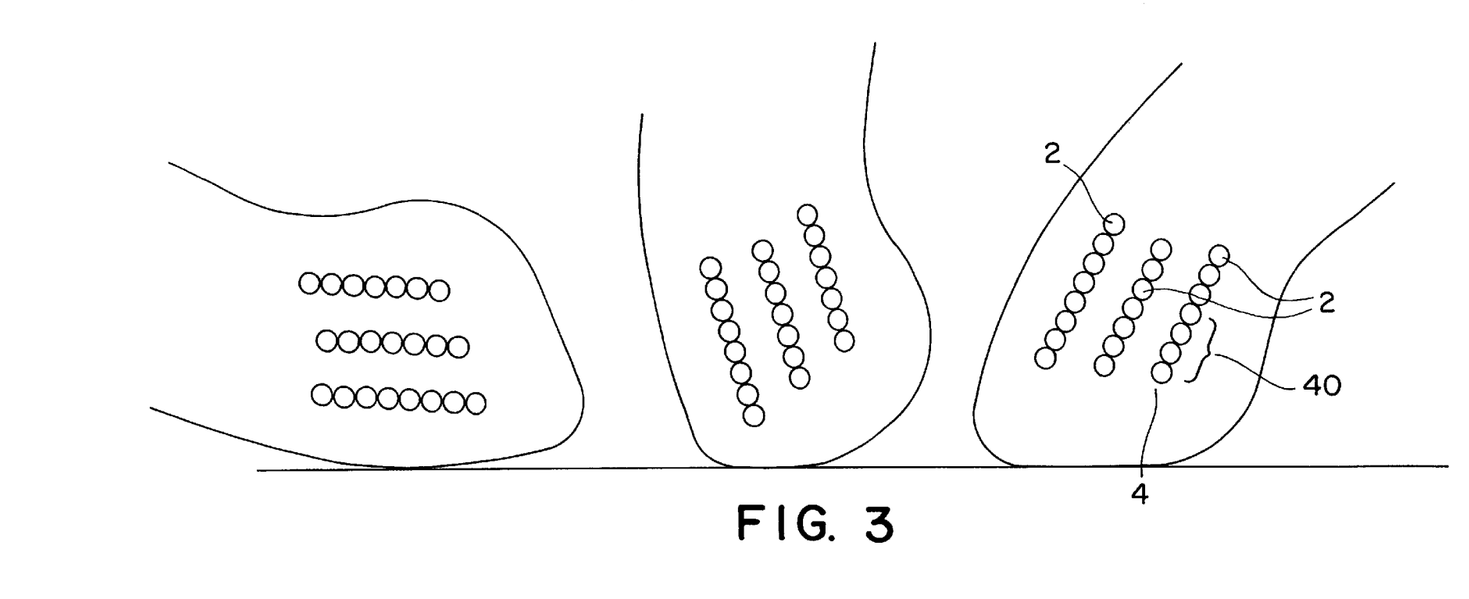
FIG. 3 illustrates the rotation of the bead upon the dismounting of a tire.

An object of the invention is to improve the ability of the bead structure described in EP Patent 0582196 referred to above to undergo dismountings, even effected under less careful conditions, in particular with unsuitable tools. In this case, during the first phase of the dismounting, the point of the bead, retained by a hump, is subjected to a rotation centered substantially on said point (see FIG. 3) because this type of bead is rather flexible in rotation in a radial plane. If this rotation extends so far as a swinging of the bead, as shown in FIG. 3, a part of the helices of the circumferential cable 2 experiences very extensive elongation. This elongation may reach about 3% in the case of the lowest helices 40 of the axially outer pile 4. In the extreme cases, this elongation is combined with a local deformation due to the pressure of the dismounting tool, the dismounting may cause the breaking of the cable in one or more helices.

In particular, the present invention is directed at permitting a very large number of dismountings, with possible reuse of the tire, without sacrificing the performance of the tire in use.

In accordance with the invention, the tire has sidewalls which terminate in beads, the beads being designed to be mounted on a rim, said tire comprising a carcass reinforcement which passes into the side walls and joins the beads, one at least of said beads comprising:

carcass reinforcing elements which extend from the radially bottom part of the bead towards the sidewall, at least one pile of circumferential cables laterally bordering the carcass reinforcing elements, said circumferential cables having an operational elongation rate $A_f = A_e + A_p$ of more than 4%, a connecting rubber mix arranged between the circumferential cables and the carcass reinforcing elements.

Figure 4:
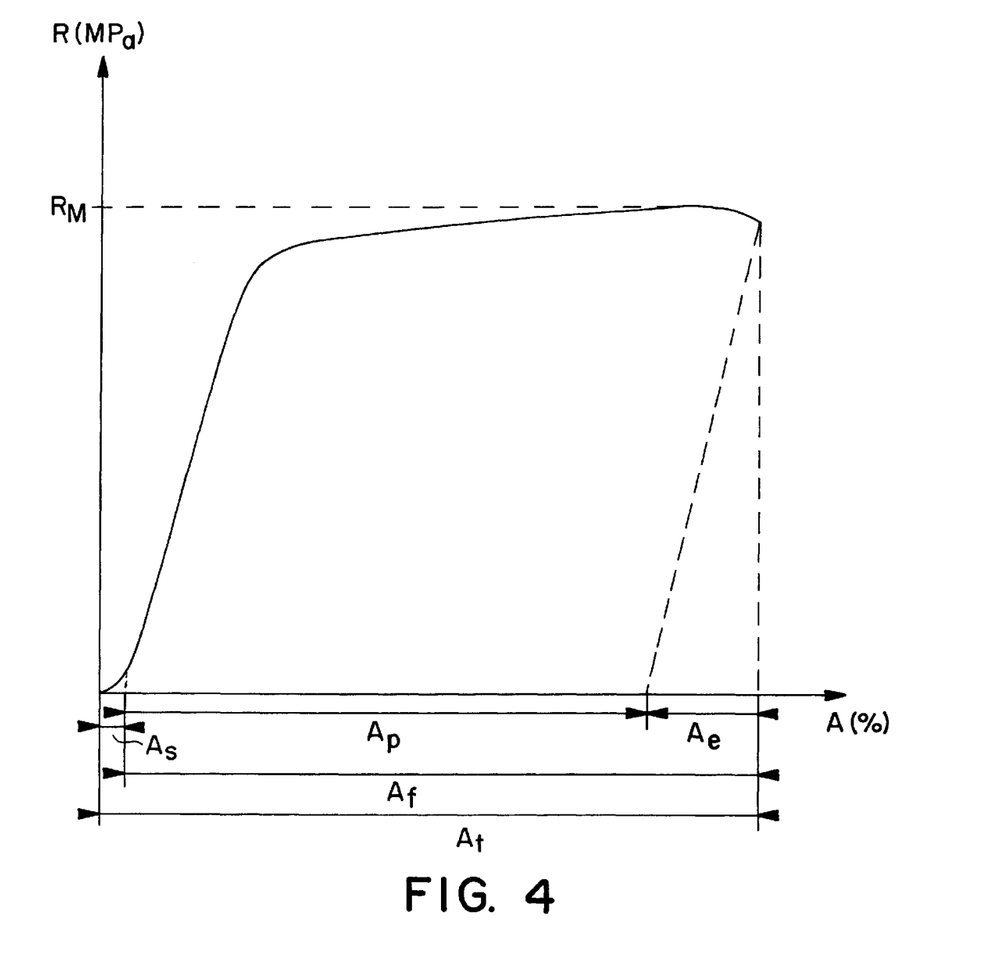
FIG. 4 illustrates the different elongations characterizing a cable.

FIG. 4 shows a stress-strain curve. There can be noted first of all an elongation $A_s$ which is the specific elongation of the "cable" effect. This elongation represents a clamping together of the wires of the cable before said wires are even stressed in traction. In the diagram, there can then be noted a plastic elongation $A_p$ and finally an elastic elongation $A_e$.

For the description of the invention, we are introducing here the concept of operational elongations rate $A_f = A_e + A_p$. This operational elongation rate does not include the specific elongation $A_s$ of the "cable" effect.

As for the maximum stress, it is determined by the following formula:

$$Rm = \frac{Fmp}{M/L}$$

in which $F_m$ is the maximum force, $\rho$ is the density of the material in question (7.8 g/cm$^3$ for the steel used), and M/L is the linear weight of the cable used.

The maximum stress $R_m$ is preferably greater than 2000 MPa and even advantageously greater than 2200 MPa, which makes it possible to construct a bead which is as light as possible, lightness being itself a performance factor and contributing to limiting the cost of the tire.

The invention will be fully understood from a reading of the following description, illustrated by means of the accompanying figures, and, in non-limitative manner, a specific embodiment of a tire bead.

DESCRIPTION OF PREFERRED EMBODIMENTS

Figures 1, 1A:
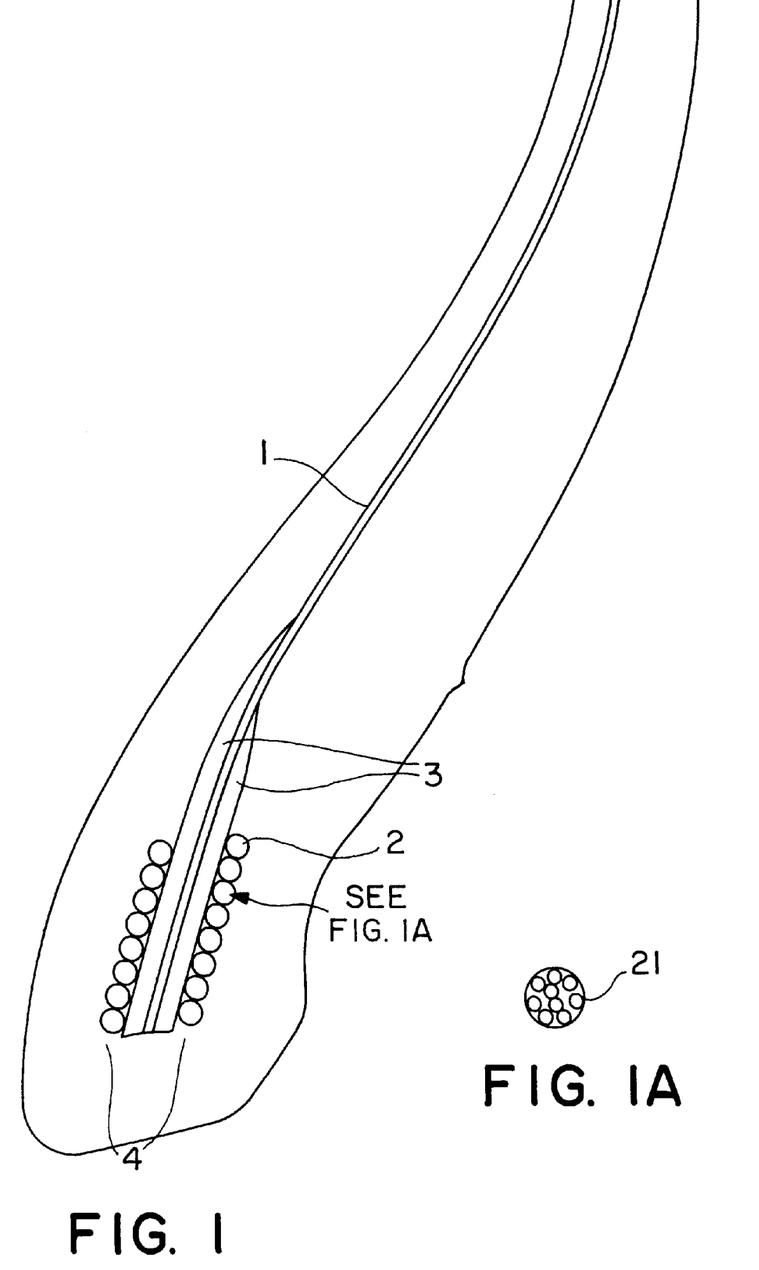
FIGS. 1 and 2 are radial sections of two variants of a tire bead in accordance with the invention.
FIGS. 1A and 2A are, respectively, enlarged sectional views shown in FIGS. 1 and 2.
Figure 2:
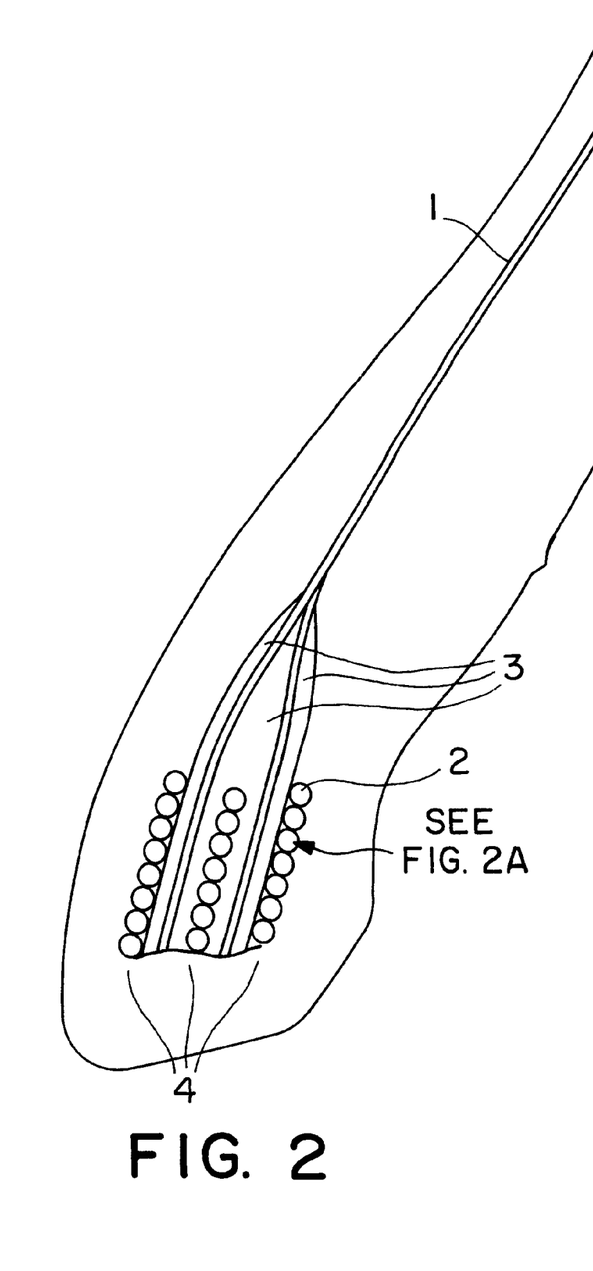
Figure 2A:
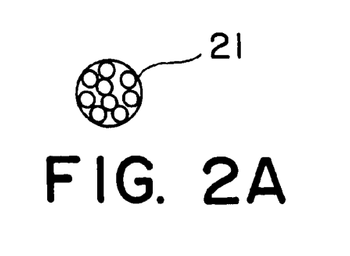

FIGS. 1 and 2 show a bead in which one can note carcass reinforcing elements 1 and circumferential cables 2.

In the present specification, the term filament means a mono-filament resulting from an extrusion, drawing or rolling operation or equivalent operation. A cable is an assembly of several thin filaments. In the case of steel filaments, there are concerned wires of a diameter of between about 0.05 mm and 0.8 mm. The present specification does not cover the different methods of producing such an assembly, which are numerous and well known to the person skilled in the art. The term "cable" includes all types of assembly of filaments (for instance strands, twists, or cables proper).

When we speak of a "reinforcing element", we refer generically to both cables and mono-filaments, whatever the course of said element, provided that it is filiform, and whatever its material. For example, a cable of rayon or of aramid falls within this generic definition.

The carcass reinforcing elements 1 may consist of metallic or non-metallic cables or mono-filaments. The anchoring of the carcass reinforcing elements 1 is effected by circumferential cables 2, with the interposition of a connecting rubber composition 3. The said composition is preferably the "MS" mixture, the formulation of which is given below in Item 6 after the first table. The circumferential cable 2 is arranged in several turns forming one or more helices. The reader can find further details concerning this type of bead in the aforementioned patent application EP 0582196. These cables 2 are, in their turn, formed of the assembling of several threads 21, clearly visible in the enlarged views shown in FIGS. 1 and 2, within circles shown to the right of the bead.

By way of example, one can use a non-hooped (2+7)0.28 cable. This cable is formed of a core composed of 2 twisted threads surrounded by a layer of 7 threads wires also twisted together but in opposite direction. However, the precise model of assembly is of no particular importance for the carrying out of the invention. The tests carried out by the applicant have indicated that what steel cable was used is not immaterial.

Figure 5:
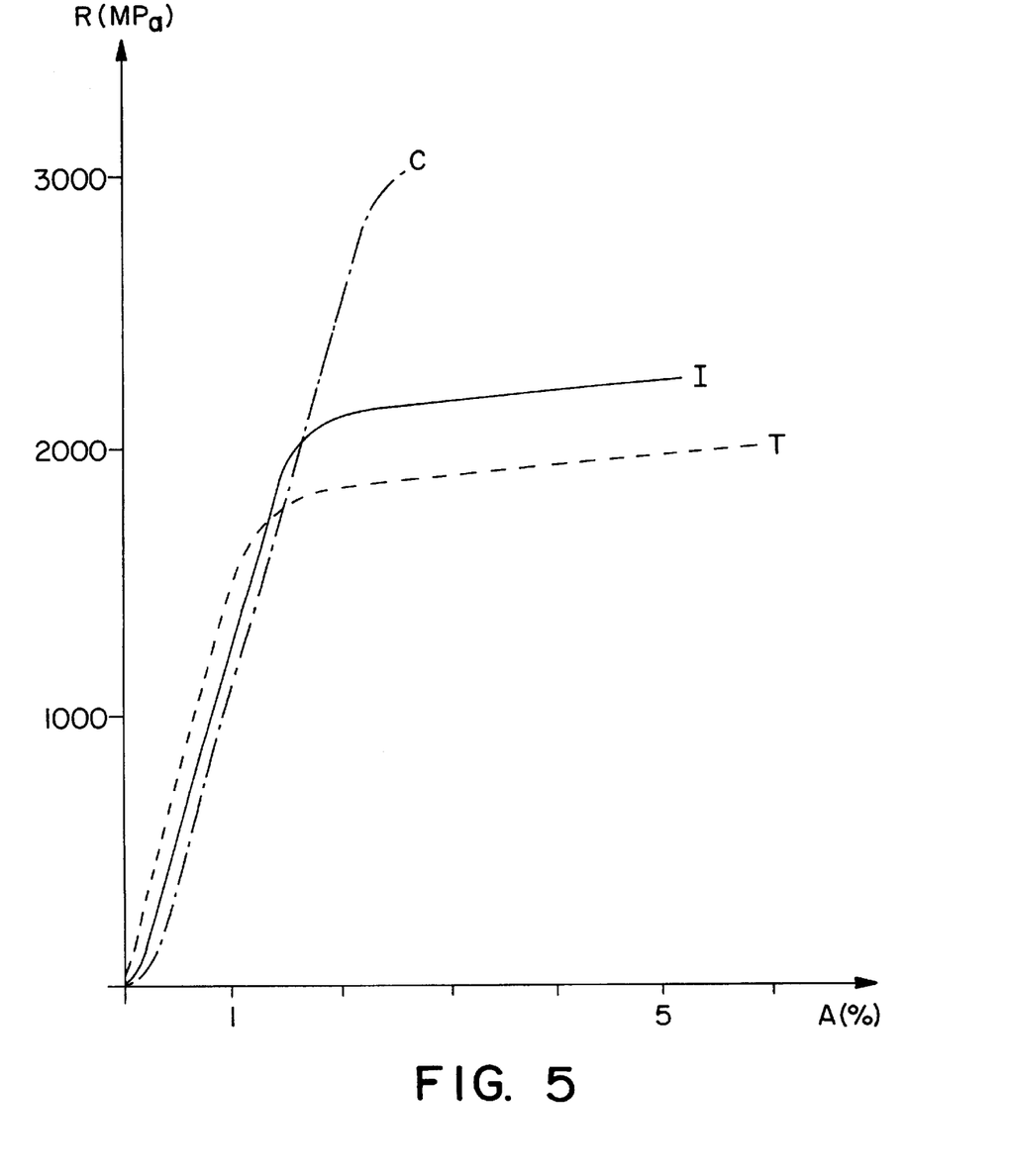
FIG. 5 illustrates the characteristics of reinforcing elements used in the tire beads.

FIG. 5 shows a stress-strain curve for a conventional cable (curve C), for a cable in accordance with the invention (curve I), and for the bead wire of conventional type (curve T). By way of background, mention may be made of U.S. Pat. No. 5,010,938 which illustrates a winding scheme of the type conventionally used to form a bead wire. It is produced by winding several adjoining helices of a bead wire. A bead wire is a steel wire of rather large diameter, on the order of 0.8 mm or even larger. This bead wire is frequently a wire of great elongation and has a maximum stress $R_m$ of about 2000 MPa (Mega Pascal; see curve T of FIG. 5). The operational elongations, corresponding here to the total elongation $A_t$, is high, on the order of 6%.

Curve C illustrates the characteristic, after vulcanization in a tire, of a steel cable currently used in tread plies. One can note an operational elongation $A_f$ of about 2%, as well as a low specific elongation of the "cable" effect, and therefore of the architecture of the cable used. Rupture takes place at a high stress level $R_m$, which may amount to 3000 MPa.

The invention is directed at obtaining a high resistance to successive dismountings, while retaining the advantage of the bead structure described in the aforementioned EP Patent 0582196. Furthermore, the invention proposes obtaining this resistance to dismounting while using materials of high maximum stress, which limits the amount of material to be used and further lightens the tire. As a result of the use of cables, another advantage of the invention is the greater ease of manufacturing the tire, since the cables are less difficult to work with (because more flexible) than wires of larger diameter, such as bead wires.

The invention proposes using a special cable 2 for forming the piles 4 of reinforcing elements. This cable has both a high maximum stress, at least as high as that of the conventional bead wires, and a great elongation, which elongation is greater than that presented by the conventional cables.

The manner in which such a cable can be obtained by a special heat treatment will now be described.

The influence of the heat treatment on the variation of the operational elongation $A_f$ is a function of the chemical composition and the work-hardening rate of the steel wire, and of the duration and temperature of the heat treatment. In order to obtain a very significant increase in the operational elongation $A_f$, it is preferable that the work-hardening rate $\epsilon$ of the wire used remain less than a value of between 3.5 and 4, the precise limit value depending on the chemical composition of the steel wire. The rate $\epsilon$ is defined by the equation $\epsilon = \ln(S_o/S_f)$ in which $S_o$ is the area of the cross section of the wire before work-hardening and $S_f$ is the area of the cross section of the wire after work-hardening.

It is known that the steel reinforcements for tires have high resistance to traction and have good adherence to rubber. The resistance is obtained upon the shaping of the steel wire by a process known to the person skilled in the art, for instance by wire-drawing. This operation, carried out on thin wire, requires a wire-drawing lubricant. In applications to tires, this wire-drawing lubricant is generally formed by a conventional adhering coating, generally of brass, deposited on the steel wire in order to favor the adherence of the rubber to said steel wire. As a variant, the adherent coating could be formed by an alloy having a base of Cu, Zn and Ni, or else any coating favoring the adherence to rubber while serving as wire-drawing lubricant. Several wires can be assembled so as to form a cable. In this way, a reinforcement is obtained consisting of work-hardened steel wire covered with an adherent coating. These reinforcements are characterized by a low ductility of the assembly or/and of the constituent wires (see curve C in FIG. 5).

A heat treatment carried out after the work-hardening in order to increase the ductility is known per se. The coating operation (for instance a brass coating) is generally effected after the said heat treatment in order not to damage the coating.

For example, French Patent 2152078 describes a means for improving the ductility by a modification of structure. It describes how a material having a tempered martensitic structure can be obtained. In French Patent 2152078, a temperature level on the order of 800° C. is exceeded. The brass coating can be deposited only after this type of heat treatment since otherwise, at the temperatures reached, the brass coating would be destroyed and this reinforcement would be unusable in a tire since it would not adhere to the rubber. Said patent then describes a tempering heat treatment which is applied to a structure which is substantially martensitic and quenched. Furthermore, since the tempering is effected in a bath of lead, a cleaning operation is then necessary, which would be very problematic if one were seeking to apply this process to assemblies such as cables and not to a monofilament (single wire) since cleaning is an operation which is very difficult to carry out on twisted cables. Finally, the conventional brass coating cannot be deposited before the tempering since the material is insufficiently ductile. If it is deposited on the cable after the tempering, it is very difficult to assure the homogeneity of the brass coating. It is therefore seen that this patent does not provide a satisfactory solution for preserving the adherence of the cable to the rubber.

In accordance with the present invention, there are proposed various methods of preparation which have proven particularly advantageous. These methods, which are of interest in themselves, are furthermore preferably applied to cables the steel wire of which has a carbon content of between 0.7% and 0.9%.

There is concerned here a heat treatment by Joule effect (hereinafter referred to as JE) at a temperature between 400° C. and 500° C. for a period of time less than or equal to 5 seconds. The times indicated are the heating times; they do not include the cooling time. One can also cite heat treatment by static convection (referred to hereinbelow as CV), the convection being preferably carried out under a protective atmosphere at a temperature below 420° C., and in this case the cooling which follows this is itself carried out under a protective atmosphere. One can furthermore cite heat treatment by induction (hereinafter designated IN), the temperature being between 400° C. and 550° C. and the time of heating being less than or equal to 1 second.

One can also carry out the heat treatment by JE or by IN in a protective atmosphere in order to limit as much as possible the degradation of the coating (for instance, the oxidation of the brass). In this case, it is preferable to keep the cable under a protective atmosphere during the cooling. As a variant or in addition to the use of a protective atmosphere one can, for all these heat treatments, provide a pickling operation, followed, as known, by rinsing with water and drying.

The present invention also extends to a heat treatment which has the following characteristics in combination. It is a recovery annealing treatment carried out at low temperature. By this there is understood a temperature which is in any event less than $Ac_1$, (temperature corresponding to a transformation of the crystalline structure of the steel) and preferably less than or equal to 550° C., while being generally greater than 250° C. It is also a treatment carried out directly on cable comprising wires covered separately by an adherent coating.

The temperature limit depends actually on the time and manner of heating. It seems that the energy contributed to the cable must be substantially identical for all the heat treatments. The temperatures given are temperatures reached on the surface of the cable. They can be measured, for instance, by thermovision, or by contact gauge when this is possible. They are noted during the heat treatment itself or just after it when it is difficult in practice to do otherwise. This is true of the values given for the IN heat treatment.

The heat treatment brings the operational elongation capacity $A_f$ of the cable to a value of more than about 4% while maintaining the resistance to traction at a level sufficient for the tire (maximum stress $R_m$ equal to at least about 2000 MPa after heat treatment) while maintaining sufficient ability to adhere to the rubber. Curve I of FIG. 5 describes a typical characteristic of such a cable. It has been clearly indicated that there is concerned an addition of operational elongation capacity since the values given do not include the specific elongation $A_s$ of the "cable" effect. Now, the additional operational elongation capacity does not depend on the architecture of the cable, of identical material, but depends essentially on the heat treatment.

The wire used is generally work-hardened steel of high carbon content (between 0.4% and 1.0% C), possibly comprising conventional elements such as manganese and silicon in order to increase certain specifically required properties, as known to those skilled in the art, and furthermore containing impurities in minor quantity. The shaping to final diameter can be effected by any process whatsoever, for instance by wire drawing. The wires are assembled so as to form a cable by a suitable method of assembly (twisting or cabling proper).

The treated cable is formed of work-hardened and tempered elementary wires. The heat treatment on the cable (that is to say, after assembly) makes it possible to treat all the wires simultaneously in a single operation.

In the following examples, the processes used and the results obtained are described. In all cases, essentially pearlitic, work-hardened, brass coated steel wire is used, constituting a non-hooped cable. Its precise chemical composition, given relative to the weight of the steel, is as follows: content of carbon: 0.81%; manganese: 0.54%; silicon: 0.25%; phosphorus: 0.01%; sulfur: 0.01%; chromium: 0.11%; nickel: 0.03%; copper: 0.01%; aluminum: 0.005%; and nitrogen: 0.003%.

EXAMPLE 1

Treatment by Joule Effect (JE) on a (2+7)0.28 Cable

The principle consists in heating the cable by Joule effect continuously during its travel under a protective atmosphere (for instance a mixture of nitrogen and hydrogen). The time of heating is about 2.7 seconds. The treatment temperature is 450° C. After the heating, the cable is cooled in a protective atmosphere ($N_2$, $H_2$) and then wound in coils. It has the following properties:

| (2 + 7)0.28 | $R_m$ (MPa) | $\Delta R_m$ (%) | $A_f$ (%) | adh test | $\Delta$adh (%) test | adh MS | $\Delta$adh (%) MS |
|---|---|---|---|---|---|---|---|
| Before LTHT | 2920 | | 2.8 | 78 | | 90 | |
| JE/$N_2$,$H_2$ | 2497 | −14 | 5.0 | 56 | −28 | 93 | +3 |

In this example, as well as in the following ones:
1. LTHT stands for "low temperature heat treatment";
2. the adhesion values (adh) are indicative of the quality of the bond between the cable and a rubber composition forming a block in which said cable is embedded, the assembly being vulcanized while leaving a part of the cable protrude to the outside of said block in order in this way to constitute a test specimen; the values given correspond to the measurement of the force necessary in order to pull the cable out of the rubber;
3. all the variations ($\Delta$) are indicated in percentage; in order to permit the classification of the different solutions by a comparative reading;
4. the intrinsic ability of the cable to adhere to rubber is checked experimentally on said test specimen by observing the force at which the cable and the matrix separate;
5. the "test" columns correspond to a so-called test mixture matrix comprising 100% NR (natural rubber), with addition of reinforcing fillers in order to obtain a suitable Shore A hardness of more than 70, a large sulfur concentration of between 5% and 8%, and a high cobalt concentration of between 0.3% and 0.4% (the percentages being given with reference to the total weight of elastomer); with respect to its ability to adhere to the cable this mixture is very sensitive to chemical variations in the brass coating on the cable;
6. the "MS" columns correspond to the preferred mixture described above with reference to EP Patent 0582196. As a reminder, said mixture comprises a SBR synthetic elastomer used by itself or blended with polybutadiene (PB), said SBR having a glass transition temperature (Tg) of between −70° C. and −30° C. and said PB having a Tg of between −40° C. and −10° C., said synthetic elastomer or elastomers being used in a total proportion of at least 40% of the weight of elastomer, the balance being formed of natural rubber. The Tg's in question are measured by differential thermal analysis. There is preferably used a mixture containing 50% SBR solution having a Tg of −48° C., 50% NR, with the addition of reinforcing fillers and resin in order to obtain the suitable Shore A hardness of more than 70. Preferably, in order to obtain good bonding of the mixture on a brass-coated wire, a large concentration of sulfur of between 5% and 8% of the total weight of elastomers is used, and cobalt is used in an amount of about 0.2% of the total weight of elastomers.

EXAMPLE 2
Treatment by Convection (CV) on a (2+7)0.28 Cable, Followed by a Pickling (DECA)

The cable is treated in a static convection furnace (recovery annealing furnace) under a controlled, protective atmosphere, for instance hydrogenated nitrogen containing 6% hydrogen. It is heated to 350° C. in 3½ hours. It is then held for 30 minutes at this same temperature. It is then cooled to room temperature in three hours. The coils are then unwound to permit the passage of the cable into a bath of orthophosphoric acid or sulfuric acid of very low concentration (about 4%). The dwell time in this pickling bath is on the order of 2 seconds. The bath is at ambient temperature. The characteristics obtained are as follows:

| (2 + 7)0.28 | $R_m$ (MPa) | $\Delta R_m$ (%) | $A_f$ (%) | adh test | $\Delta$adh (%) test | adh MS | $\Delta$adh (%) MS |
|---|---|---|---|---|---|---|---|
| Before LTHT | 2920 | | 2.8 | 78 | | 90 | |
| CV + DECA | 2443 | −16 | 5.4 | 67 | −14 | 85 | −6 |

EXAMPLE 3
Treatment by Induction (IN) on a (2+7)0.28 Cable

The traveling cable is heated by induction in a protective atmosphere (cracked $NH_3$ or $N_2$,$H_2$). The recovery annealing is effected by electromagnetic conduction by causing induced currents to flow over a length of about 40 cm, the speed of treatment may be variable (80 m/min, for example), the system being adjusted to obtain a homogeneous heat treatment of the cable. The temperature noted on the surface of the cable and at the outlet of the inductor is on the order of 450° C. The characteristics obtained are as follows:

| (2 + 7)0.28 | $R_m$ (MPa) | $\Delta R_m$ (%) | $A_f$ (%) | adh test | $\Delta$adh (%) test | adh MS | $\Delta$adh (%) MS |
|---|---|---|---|---|---|---|---|
| Before LTHT | 2920 | | 2.8 | 78 | | 90 | |
| IN/$N_2$,$H_2$ | 2524 | −14 | 5.4 | 39 | −50 | 86 | −4 |

EXAMPLE 4
Treatment by Joule Effect (JE) on a (3+8)0.35 Cable, under Protective Atmosphere

| (3 + 8)0.35 | $R_m$ (MPa) | $\Delta R_m$ (%) | $A_f$ (%) | adh test | $\Delta$adh (%) test | adh MS | $\Delta$adh (%) MS |
|---|---|---|---|---|---|---|---|
| Before LTHT | 2537 | | 3.09 | 90 | | 85 | |
| JE/$N_2$,$H_2$ | 2410 | −5 | 5.31 | 68 | −24 | 101 | +19 |

The analysis of these examples makes it possible to note that the absolute value of the adherence of the rubber on the cable depends also on the formula of the rubber mix used. One can thus accept a greater or lesser alteration of the adherent coating due to the heat treatment depending on the formulation of the mixture used for the connecting rubber 3.

If the aforementioned MS mixture is used, one can accept a greater decrease (on the order of 70% referred to the "test" mixture) since the adherence performances obtained with this mixture are less sensitive to a modification of the chemical nature of the coating upon the low temperature heat treatment. However, preferably, there will only be used solutions which have a decrease of less than 50% compared with the test mixture. In all the above examples and in particular in Example 3, it can be noted that the MS mixture offers the best ability to contain the decrease to a low level in the most unfavorable cases. However, other types of mixtures could be formulated and this last remark is not limitative. Other conditions for the carrying out of heat treatments could be used; it is possible that in certain cases one will arrive at a smaller decrease of the adhesion, which would make it possible to use said "test" mixture for the layer 3, or else to use another mixture possibly less favorable for the adhesion than the MS mixture.

In conclusion, the invention proposes a method of preparing a wire cable in which, starting from a cable made of work-hardened steel wire covered with an adherent coating which favors adhesion between the steel and the rubber, said cable is subjected to a recovery annealing heat treatment at a temperature between 250° C. and $Ac_1$, for a period of time preselected in such a manner as to bring the operational elongation rate $A_f$ to a value of more than 4%, employing means such that, by controlling the ability of such a cable to adhere to a "test" rubber mixture before and after such preparation, the decrease observed is less than or equal to 70%.

Said means can be a pickling of the steel wire subsequent to the LTHT or the selection of a sufficiently protective atmosphere during the LTHT and the cooling which follows it, or any other means of equivalent effect.

By means of the invention, good adherence is preserved between rubber and metal. Furthermore, in case of important stresses upon dismounting, the cable 2 exceeds the elastic limit but still remains below the rupture limit. The cable therefore retains a zone of elastic behavior even when a localized force has brought it beyond its initial elastic limit. Even if a substantial residual elongation remains (on the order of 2 to 3%) in the zone stressed by a dismounting, this elongation, referred to the total perimeter of a cable helix 2 represents only a value on the order of 1 in a 1000, which in no way disturbs the good performance of the tire on the rim after a new mounting.

The value in use of the tire produced in this manner is in no way altered by the few dismounting and mounting cycles which a tire may endure during its life, and this even though an elongation exceeding the elastic limit takes place upon each dismounting. Not only does this elongation concern only a very small length of cable, as we have seen, but furthermore, such an elongation takes place only on a small part of the superimposed helices and preferably in the case of the pile which is axially to the outside of the bead.

It has been proposed above to use a specific cable of large elongation as circumferential reinforcement which assures the anchoring of the carcass reinforcing elements. It is proposed below to comply with geometric rules of construction for the architecture of the bead. These rules can be used in combination with the type of cable defined above, or else independently of this type of cable. These construction rules can therefore be used whatever the circumferential reinforcing element used, even if the cable 2 is replaced by textile cables or by single-filament reinforcements, whatever their nature and geometry. We note that, preferably, the circumferential reinforcing element must be of rather large elongatability. If a bead wire (metal monofilament) is used, it is a wire of large elongation (see, for instance, curve T in FIG. 5).

Figure 6:
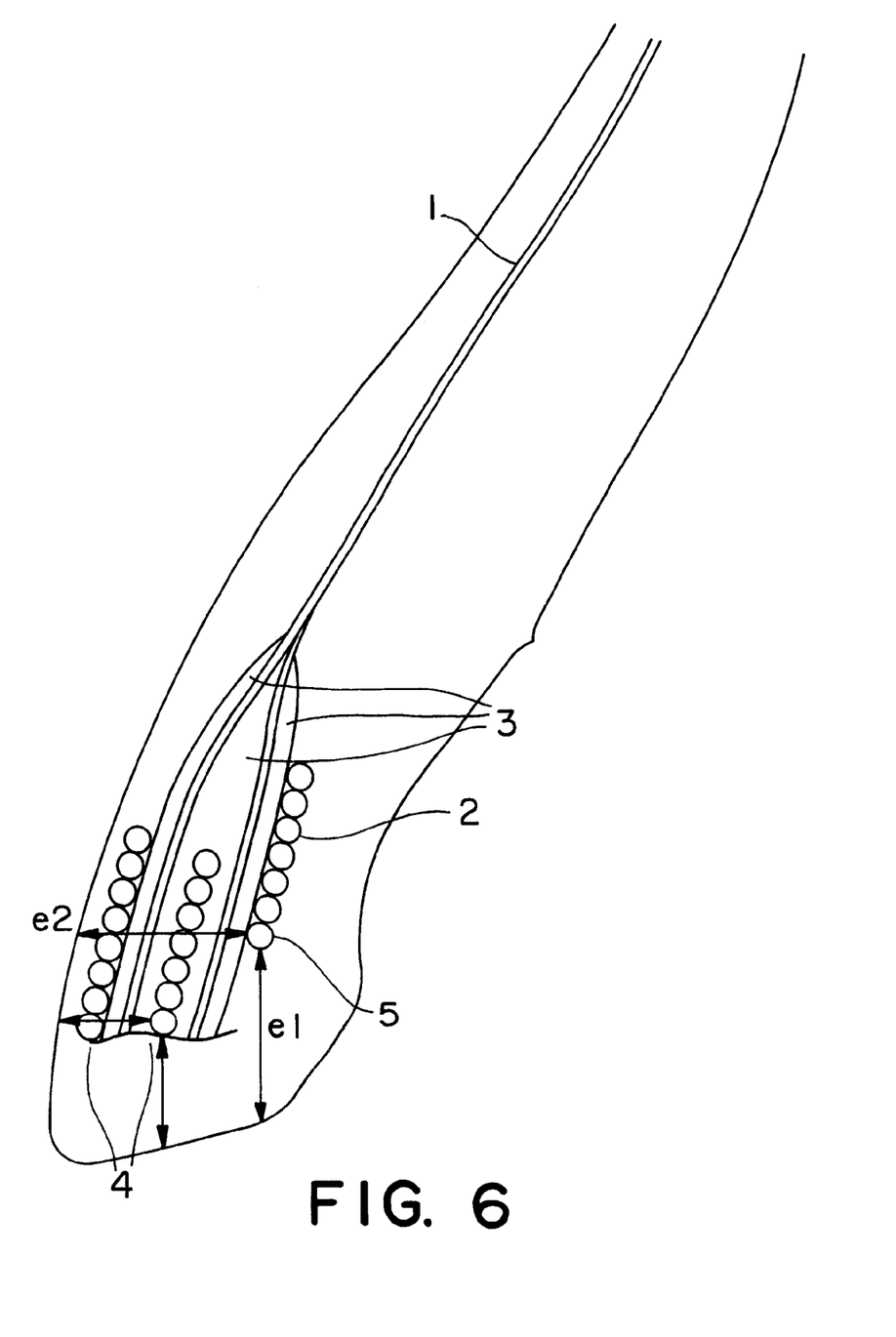
FIGS. 6 and 7 illustrate variant embodiments of the invention.
Figure 7:
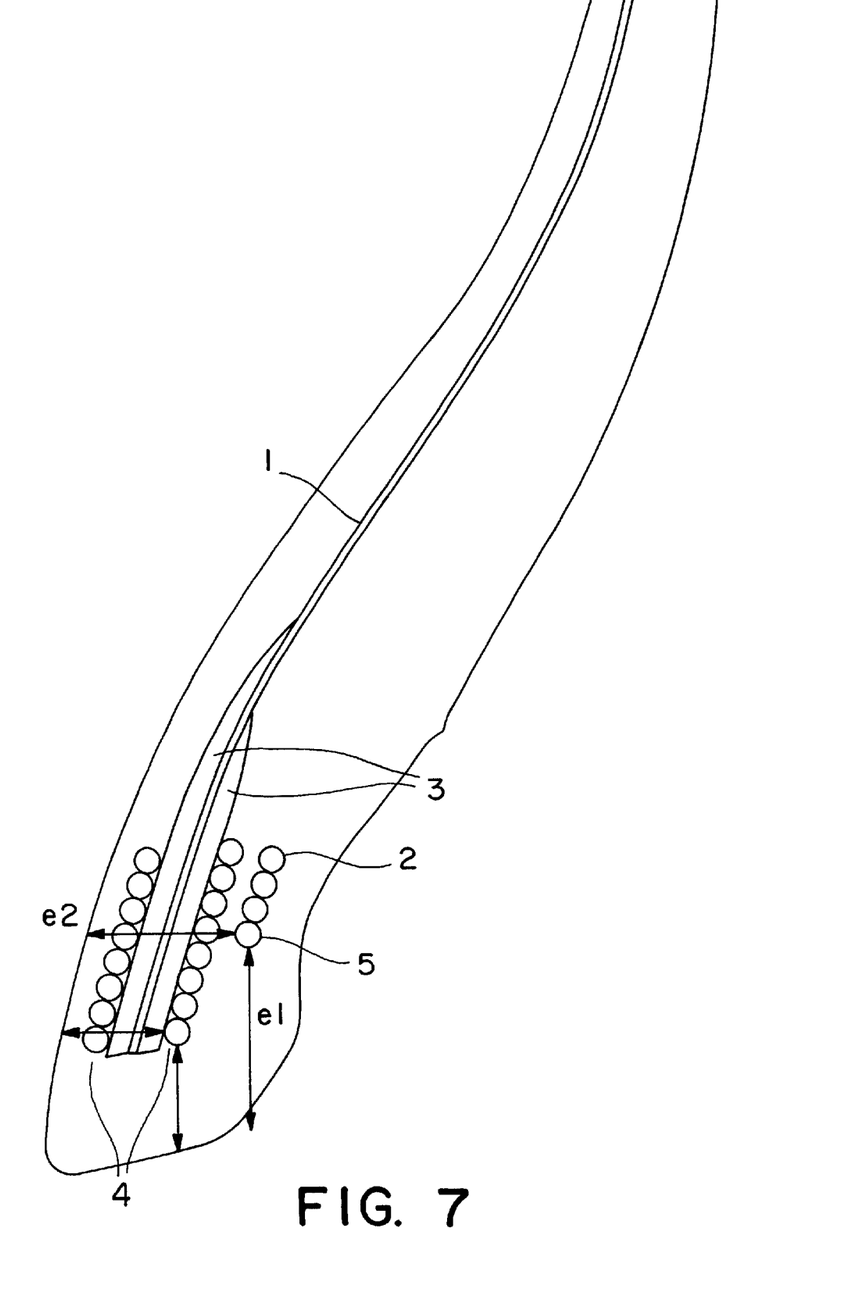

When, for instance, the dimensioning of the bead and/or the selections of materials make the bead relatively large, it is advantageous to shift the pile bottom 5 which is axially furthest to the outside radially upward, as illustrated in FIGS. 6 and 7. Thus, when there are at least two piles of circumferential reinforcing elements 2 laterally bordering the carcass reinforcing elements, there is a radial stagger between the radially lowest part of said pile 5 and of the adjacent piles 4. This also contributes to limiting the stressing of the cables on the dismounting of the tire. The radially lowermost part of each pile is preferably shifted laterally upward with respect to the radially lowest part of the adjacent pile on the axially inner side.

Figure 8:
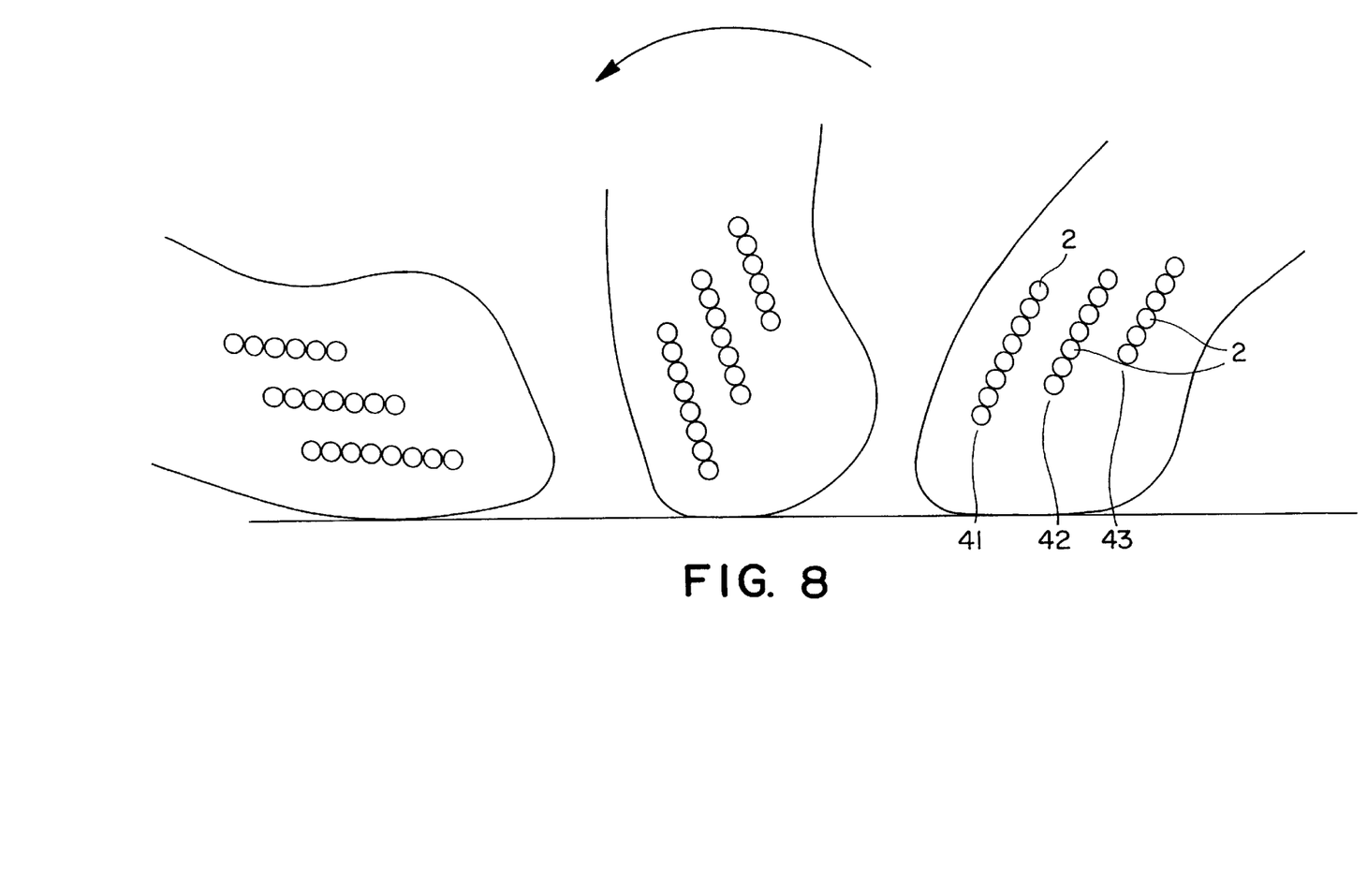
FIG. 8 illustrates another variant, stressed in rotation upon the dismounting of a tire.

Along the same line, the lowermost helix of each pile 41, 42, 43 (see FIG. 8) is located at a radial level such that, upon a tilting of the tire, it is not forced to increase in diameter by more than a value which limits the elongation of the cable to a level which it can withstand without damage. Stated differently, the excess tension of the helices which are stressed the most remains slight. We note that the increase in the perimeter of the helices concerned is not proportional to what can appear as an increase in diameter in FIG. 8. In fact, it has been explained above that the deformation does not uniformly effect the entire course of the helix in question. The stress causing the tilting of the tire is a local stress. We also note that, at the time that the bead rests on the point (central position in FIGS. 8 and 3), the point is deformed, in particular under the effect of shearing stresses which act at this time on the relatively slight thickness, which limits the extension which the different helices undergo.

From another aspect, one can take more precisely into account the geometry of the bead, even the different hardnesses of the products which one can encounter. In FIGS. 6 and 7, the total distances $e_1$ and $e_2$ have been indicated, $e_1$ being the distance in the radial direction between the lowermost helix of the surface of the bead which is to come in contact with the seat of the rim (or its extension, if applicable), and $e_2$ being the distance in axial direction between the lowermost turn from the surface of the bead on the side of the internal cavity of the tire, that is to say joining the axially inner side. In order that the helix in question does not suffer a damaging excessive tension, it is advisable, in first approximation (that is to say assuming that the hardness of the different crossed products along the segments marked $e_1$ and $e_2$ in FIGS. 6 and 7) that $e_2$ is smaller than or equal to $e_1$. Taking into account more precisely the exact nature of the different components, and considering that $e_{1j}$ is the thickness of each product which radially separates the radially lowermost helix of any pile from the radially lower face of the bead, and that $e_{2i}$ is the thickness of each product which radially separates the radially lowest helix of any pile from the axially inner face of the bead and that $G_{1j}$ and $G_{2i}$ are the respective Young's moduli of the products in question, then the criterion for the design can be expressed as follows:

$$\sum_i e_{2i} * G_{2i} \leq \sum_j e_{1j} * G_{1j}$$

There is thus proposed an architecture in which each helix of the piles 4 or 5 has its tension level decrease upon the tilting of the bead, which leads to decreasing the level of clamping and to facilitating the dismounting. The rules proposed are experimental. The desired result is that, while the bead tilts, it does not experience any harmful elongation. As soon as the bead has left its seat, it expands, even on the axially inner side of the wheel, where the seat is frequently extended by a rather wide, generally cylindrical zone (rim well shifted axially towards the outside). Thus, the essential thing is that during the tilting, each helix is not forced to pass to a radial position above its reference position in the bead not stressed in rotation (see FIG. 8).

We claim:

1. A tire having sidewalls terminating in beads, said tire having a carcass reinforcement which passes into the sidewalls and joins the beads, at least one of said beads comprising:

carcass reinforcing elements extending upwardly from the radially bottom part of the bead towards the sidewall, said carcass reinforcing elements being arranged in alignments forming a partial conical frustrum, the axis of which coincides substantially with the axis of rotation of the tire, and at least two piles of circumferential carcass anchoring elements laterally bordering the carcass reinforcing elements, each pile embodying a helical winding of said carcass anchoring elements, the radially lowermost part of the axially outermost pile being radially higher than the radially lowermost part of the axially inwardly adjacent pile so that there is an ever-increasing radial thickness of rubber product in the bead between the lowermost part of each pile and the radially lower surface of the bead from the axially innermost pile with respect to the next axially outer pile, starting from the axially innermost pile.

2. A tire according to claim 1, in which the radially lowermost portion of each pile is located radially higher with respect to the radially lowermost portion of the adjacent pile on the axially inner side.

3. A tire comprising sidewalls terminating in beads, said tire having a carcass reinforcement passing into the sidewalls and jointing the beads, at least one of said beads comprising:

carcass reinforcing elements extending from the radially bottom part of the bead towards the sidewall, said carcass reinforcing elements being arranged in alignments forming a partial conical frustrum, the axis of which coincides substantially with the axis of rotation of the tire, at least two piles of circumferential carcass anchoring elements laterally bordering the carcass reinforcing elements, each pile embodying a helical winding; and materials such that $e_{1j}$ is the thickness of each product which radially separates the radially lowermost helix of any pile from the radially lower face of the bead, and that $e_{2i}$ is the thickness of each product which axially separates the radially lowermost helix of any pile from the axially inner face of the bead, and that $G_{1j}$ and $G_{2i}$ are the effective Young's moduli of the products in question, said materials satisfying the following relationship:

$$\sum_i e_{2i} * G_{2i} \leq \sum_j e_{1j} * G_{1j}$$

4. A tire according to claim 3, in which each pile is radially and axially located within the bead such that the radial distance between the radially lowermost part of each pile and the radially lower surface of the bead is equal to or greater than the axial distance between said radially lowermost part of said each pile and the axially inner surface of the bead.

* * * * *

UNITED STATES PATENT AND TRADEMARK OFFICE
CERTIFICATE OF CORRECTION

PATENT NO.     : 6,425,429 B1  
DATED          : July 30, 2002  
INVENTOR(S)    : Arnaud et al.

It is certified that error appears in the above-identified patent and that said Letters Patent is hereby corrected as shown below:

Column 3,  
Line 1, "$Rm = \dfrac{Fmp}{M/L}$" should read -- $Rm = \dfrac{Fm\rho}{M/L}$ --

Signed and Sealed this

Twenty-eighth Day of January, 2003

JAMES E. ROGAN  
*Director of the United States Patent and Trademark Office*